Patented May 2, 1944

2,347,849

UNITED STATES PATENT OFFICE 2,347,849

STARCH MODIFICATION

Joseph K. H. Seiberlich, Medfield, Mass.

No Drawing. Application November 4, 1940,
Serial No. 364,241

2 Claims. (Cl. 127—33)

The present invention relates to the manufacture of starch products, and has for its principal object the modification of starch to render it suitable for use in the manufacture of products of great transparency.

Another object of the invention is the production of starch products of considerable strength and more especially a film of considerable strength and great transparency. This application is a continuation in part of my pending application Serial No. 276,661, filed May 31, 1929.

Starch is an amorphous, hygroscopic, velvety substance consisting of fine granules or grains which have a more or less concentric structure. These starch granules are composed of an outer wall and an inner core or sol, the wall consisting of amylopectin or alpha amylose and the core consisting of beta amylose. Chemically, starch is regarded as a polyglucosidic combination of glucose units.

It has been known to produce thin, clear starch solutions and to cast such solutions into opaque or non-transparent films by forming a suspension of starch in water and subsequently oxidizing such suspension by means of oxidizing agents, such as calcium hypochlorite. The oxidation processes of starch as heretofore carried out resulted in at least partial decomposition or depolymerization of the long, complicated chains of glucose units into shorter and less complicated glucose units, and the destruction of the walls of the granules.

I have determined that a starch film produced by such process is relatively weak and that this weakness is due mainly to the fact that the original structure of the starch granules has been substantially or completely destroyed. I have discovered that better starch films can be produced if the breaking up or decomposing of the starch granules, particularly the walls thereof, can be prevented.

In its broad aspect, the invention contemplates a pretreatment of starch to render the outer wall of the starch granules more elastic and increase their swelling properties. This is accomplished by subjecting an aqueous suspension of the starch to the action of an extremely weak solution of any suitable swelling agent at a temperature below the temperature at which gelatinization of the starch takes place and for a period time such that maximum swelling is obtained without substantial oxidation or disintegration. The concentration of swelling agent and temperature used are interdependent, that is, if one is increased, the other must be lowered. Before substantial oxidation or disintegration takes place, the swollen material is washed to remove the swelling agent. Preferably, during the treatment, the suspension is maintained slightly alkaline. Good results have been obtained where the pH value is between 7 and 8.5. Such pretreatment increases the swelling characteristics of the outer wall of the starch granule rendering it more elastic and transparent thereby making the dividing line between the wall and inner portion less definite and more difficult to observe microscopically. Since the swelling properties of the granules are increased, the long chains of glucose units are not subsequently split into smaller units and, hence, the important physical and chemical properties of the original starch are not materially altered.

Any non-acidic substance, which in aqueous solution, is known to be capable of swelling starch granules may be used in the pretreatment of starch in accordance with the invention. Among such substances are oxidizing agents, such as sodium or calcium hypochlorite, hydrogen peroxide, sodium perborate and the like, and non-oxidizing substances, such as potassium sulfocyanate, urea, thio-urea and sodium bromide. Since such substances are well known as starch swelling agents and since they do not fall in any recognized chemical class they will be referred to as "swelling agents."

The invention is applicable to starch from any source but potato starch is preferred because of its low cost. It is desirable to use the raw potato starch as obtained by grinding potatoes with a water content of from 10 to 15% by weight because there would be no advantage in drying the starch and then adding water to it. Furthermore, starch may change chemically when heated or dried and any chemical change is undesirable.

Starch pretreated in accordance with the invention provides an excellent base material for the manufacture of various starch products either by molding or casting, such as films, sheets, threads, filaments, plastics and the like. It may also be used in the manufacture of plastics by reaction with resin components, such as phenol, urea, thio-urea, formaldehyde and the like to obtain glass clear products.

Starch as thus treated retains most of its original characteristics. The vesicles have not been broken up but merely greatly swelled. If dried, the starch granules contract but the outer wall has been rendered more elastic and its swelling characteristics have been increased. No oxidation process, that is no breaking up of the vesicles has been affected as can be easily seen by the fact that the starch does not show a reaction with Congo red as would be the case had depolymerization taken place. Also the starch has not lost its property of showing double refraction under polarized light.

The invention in its more specific aspect contemplates the production of a transparent cast starch film. Thus, in accordance with this aspect of the invention, an aqueous dispersion of starch pretreated as previously described is gelatinized by heating and the heating is continued until the gelatinous liquid mass becomes thin and clear as its temperature approaches the boiling point. The solution may be thinned by adding water or like aqueous liquid or thickened by evaporation and then cast upon a heated rotatable drum or travelling metal belt to form a film. It is desirable to add an agent to prevent the film becoming brittle. Plasticizers may be used for this purpose, but a hygroscopic agent, either organic or inorganic, is preferred. Calcium and magnesium chlorides, calcium and sodium phosphates, beta ethoxy glycolate, beta ethoxy lactate, beta ethoxy maleate, monacetine and tetraethylene and tetramethylene glycols are suitable for this purpose.

The following is an illustrative example of the practice of the invention, first, in pretreating the starch, followed by the use of such pretreated starch in the manufacture of a cast transparent film.

Using potato starch which has a gelatinization temperature of about 65° C., a suspension is formed by putting 500 grams of normal potato starch with a water content of 10 to 15% by weight in a container together with 500 ccm. of a commercial sodium hypochlorite solution having a chlorine content of about 2 grams per liter which is appreciably less than 1% by weight of the mixture. The starch suspension is slowly stirred for one hour. The slow stirring process must be carried out at temperatures below the gelatinization temperature of the starch. The suspension is maintained at a pH value of about 7.2 by neutralizing it, if necessary, with hydrochloric or acetic acid. With the aforementioned suspension containing about .1% by weight of chlorine, good results have been obtained by stirring at room temperature (15° C.). At higher temperature the suspension must be more diluted with respect to the chlorine content in order to obtain similar results. After the stirring is brought to an end, the suspension is filtered and washed with water until it is free from hypochlorite.

135 grams of wet starch, pretreated as described above and containing about 30% by weight of water, are placed in a container and 300 ccm. of cold water are added, thus forming a 25% starch suspension. This suspension is stirred until uniform dispersion is attained to prevent the subsequent formation of lumps. Then, the suspension is heated, preferably by placing the container in a boiling water or steam bath, to a temperature somewhat below that of the gelatinization temperature. Good results have been obtained in the case of potato starch by heating the suspension to about 50° C. while slowly stirring it. Thereupon sudden heating is effected by the addition of 300 ccm. of boiling water to the above suspension in order to effect complete and sudden gelatinization. Thus, broadly, the suspension of pretreated starch is first gradually heated to a temperature somewhat below that of the gelatinization temperature and then suddenly brought to a temperature above that of the gelatinization temperature. During heating the dispersion is slowly stirred. After complete gelatinization, heating is continued more strongly until the milky gelatinous mass becomes thin and glass clear as its temperature rises to just below the boiling point.

At this point the product is a greatly swollen transparent starch gel of a viscosity about equal to that of glycerin or paraffin oil. This greatly swollen transparent starch solution may be used as a sizing substance for textile, paper or like fibrous material. The solution may be thinned by adding water or like aqueous liquid in case it is to be used as a base for filaments, or thickened by evaporation if it is to be used for casting film.

When the solution is to be used for casting films it is desirable to add to the hot solution a hygroscopic agent, such as calcium chloride, to prevent the cast film from becoming brittle. Good results have been obtained by the addition of from 5 to 10% calcium chloride based upon the weight of the solution. The clear viscous liquid is then run upon a heated rotating drum. The temperature of the drum may be varied between 60 to about 120° C. to permit control of the film thickness. The thickness also may be controlled by varying the speed of rotation of the drum or viscosity of the solution. The solution poured upon the drum dries quickly and the dried film may be removed after a partial revolution of the drum. The film thus produced may be coated in a known manner to render it moisture proof.

The film is smooth, highly transparent, flexible and of a strength comparable with similar films made from cellulose hydrate products. As compared with films made from cellulose and like products, the starch film has the advantage of lower manufacturing cost and greater uniformity. The lower manufacturing cost is due to the relatively low price of raw starch and to the fact that there is no waste in the manufacturing process, defective film may be recast. The casting solution may be used with relatively high starch concentration. In the above example, for instance, the starch content is about 25%, but even higher concentration of starch solution may be readily cast into film and like products in contrast to solutions made from cellulose hydrate which can be cast only in low concentration and therefore require more heat for drying.

The great uniformity of starch products is due to the uniformity of the raw material. Starch, whether potato, corn or other starch, is much more uniform than, for instance, cellulose material. The most remarkable characteristic of starch products made according to my invention, aside from their great transparency, is their considerable tensile strength. This strength, as already indicated, is due to the fact that the starch in my products has not been oxidized; the original starch units therefore have retained all their chemical and most of their physical characteristics. The relatively large vesicles are still present and adhere to each other somewhat like the bricks of a wall. If it is desired to dye such starch products, a dyestuff may be added to the starch solution before casting or the product may be dyed by dipping or spraying after the product is completed. Certain ingredients, pigments or fillers, for example, mica, titanium dioxide, insoluble zinc, aluminum powder, lead salts, organic dyers and lakes may be added to the starch solution before casting to produce various desirable effects in the finished product.

I claim:

1. In the manufacture of starch products, the steps comprising treating raw starch in suspension in an aqueous solution of sodium hypochlorite with a chlorine content of 0.1 of one percent or less by weight of the suspension at a temperature below the gelatinization temperature of the starch for a period of time such as to obtain maximum swelling of the starch vesicles without substantial oxidation or disintegration thereof, maintaining the pH value of the suspension between 7 and 8.5 during said treatment, washing the thus treated starch, and thereafter heating a suspension of the thus treated starch to a temperature above its gelatinization temperature to form a glass clear liquid.

2. In the manufacture of starch products, the steps comprising treating raw starch in suspension in an aqueous solution of sodium hypochlorite with a chlorine content of about 0.1 of one percent by weight of the suspension of a temperature of about 15° C. for about one hour thereby obtaining maximum swelling of the starch vesicles without substantial oxidation or disintegration thereof, maintaining the pH value of the suspension between 7 and 8.5 during said treatment, washing the thus treated starch, and thereafter heating a suspension of the thus treated starch to a temperature above its gelatinization temperature to form a glass clear liquid.

JOSEPH K. H. SEIBERLICH.